(12) United States Patent
James

(10) Patent No.: US 11,952,251 B2
(45) Date of Patent: Apr. 9, 2024

(54) LIFT DOLLY ASSEMBLY FOR WATER HEATER

(71) Applicant: Scott James, Midlothian, TX (US)

(72) Inventor: Scott James, Midlothian, TX (US)

(*) Notice: Subject to any disclaimer, the term of this patent is extended or adjusted under 35 U.S.C. 154(b) by 306 days.

(21) Appl. No.: 17/172,737

(22) Filed: Feb. 10, 2021

(65) Prior Publication Data
US 2022/0250888 A1 Aug. 11, 2022

(51) Int. Cl.
*B66F 9/18* (2006.01)

(52) U.S. Cl.
CPC .................................. *B66F 9/187* (2013.01)

(58) Field of Classification Search
CPC . B66F 9/187; B62B 1/14; B62B 1/264; B62B 1/16; B62B 2202/02; B62B 2202/80; B62B 2203/10; B62B 2203/44
See application file for complete search history.

(56) References Cited

U.S. PATENT DOCUMENTS

| | | | | |
|---|---|---|---|---|
| 4,458,785 A * | 7/1984 | Bushnell, Jr. | ............ | B66F 9/08 182/69.6 |
| 7,018,155 B1 * | 3/2006 | Heberling | ............ | B65F 1/1452 414/428 |
| 9,242,662 B2 * | 1/2016 | Scott | ............ | B62B 1/16 |
| 10,173,704 B2 * | 1/2019 | Jones | ............ | B62B 1/14 |
| 10,214,228 B2 * | 2/2019 | Benton | ............ | B62B 1/264 |
| 10,583,849 B1 * | 3/2020 | Logsdon, Sr. | ............ | B62B 1/06 |
| 2005/0110232 A1 * | 5/2005 | DiBenedetto | ............ | B62B 1/14 280/47.29 |
| 2006/0055134 A1 * | 3/2006 | McLoughlin | ............ | B62B 1/14 280/47.28 |
| 2010/0021275 A1 * | 1/2010 | Ratermann | ............ | B62B 1/14 414/454 |
| 2010/0327544 A1 * | 12/2010 | Pebworth | ............ | B62B 1/14 280/6.151 |
| 2012/0145978 A1 * | 6/2012 | Rich | ............ | B62B 3/0637 254/2 R |

* cited by examiner

*Primary Examiner* — Lynn E Schwenning
(74) *Attorney, Agent, or Firm* — Law Office of Jeff Williams PLLC; J. Oliver Williams

(57) ABSTRACT

A lift dolly assembly includes a lift dolly having a base plate, a handle, and a frame. The dolly includes one or more wheels to permit the frame and the base plate to carry an object or load by tilting the dolly backwards. The assembly also includes a track, a lift mechanism, and a lift plate. These components are configured to work in communication with the dolly to support and allow the elevating and orienting of an object or load. In general operation, an object is located on a base plate 105 and is secured to a lift plate. The object may then be selectively lifted and oriented to a non-vertical orientation to allow the base of the object to extend fully outward beyond the base plate.

12 Claims, 4 Drawing Sheets

LIFT DOLLY ASSEMBLY FOR WATER HEATER

BACKGROUND OF THE INVENTION

1. Field of the Invention

The present application relates to a hand truck, and more particularly to a hand truck configured to lift and maneuver a water heater.

2. Description of Related Art

Water heaters are used to generate hot water in buildings for use by occupants. They serve as miniature water tanks and can vary in size, customarily between 50-100 gallons in size. When installed, water heaters are located in a tub or basin that includes an outlet or drain. This contains any leaks that may occur and permits adequate drainage to avoid damage to the nearby structure. The use of the tubs adds another complexity with locating water heaters. The water heater typically has to be lifted up into the tub over the lip of the tub. This action has to be done manually and is not easily performed.

The ability to move or reposition water heaters is hindered by a number of factors. For example, the storage of water makes them heavy when full and often prevents them from being transported or moved without emptying them. When empty, the size of the water heater hinders its movement as does the locations they are customarily located in. The location for water heaters is often tucked into tight areas where access is a premium. An installer has to use his/her back and arms to wrap around the water tank and manually lift it off the floor and move it forward into the tub. This leads to injury, fatigue, and potentially damage to nearby structure. The same factors and disadvantages apply equally with removal of water tanks.

Although strides have been made with water heaters, shortcomings remain. It is desired that a method and device be provided to ease the manner of installation of water heaters.

BRIEF SUMMARY OF THE INVENTION

It is an object of the present application to provide a manner and method to maneuver a water tank or other large object into an out of a space. In particular herein, the object is a water tank wherein the tank has to be lifted up and over a raised edge for installation and removal. The method involves steps for installation wherein the tank is located on the lift dolly of the present application. The tank is secured to a lift plate wherein it is subsequently lifted upward along the frame of the lift dolly. The lift plate includes a pivoting plate that is configured to permit selective orientation of the water tank. Once lifted and oriented out of a vertical position, the lift dolly can be moved along the surface adjacent an elevated edge. The tank can then be lowered such that a lower edge of the tank is placed on an opposing side of the edge. The lift dolly may optionally be tipped forward as needed. Once situated, the tank is fully lowered and unsecured from the lift plate. It is then oriented and positioned as needed. A further object of the application permits for the removal of the tank wherein the steps are generally reversed.

It is a further object of the present application that the lift dolly be configured to have a lift plate that can be selectively raised and lowered between opposing tracks. The lift plate includes a pivoting plate in communication with a securement device, such as a strap. This allows the lift dolly assembly to allow reorientation of an object while secured to the lift plate.

It is an object of the present application to permit for various manners of lifting. Any one of manual contraptions may be included on a dolly to raise and lower the lift plate. Other embodiments may include an electric motor. One or more gears or solenoids/pistons may be used to actuate between the raised and lowered positions.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
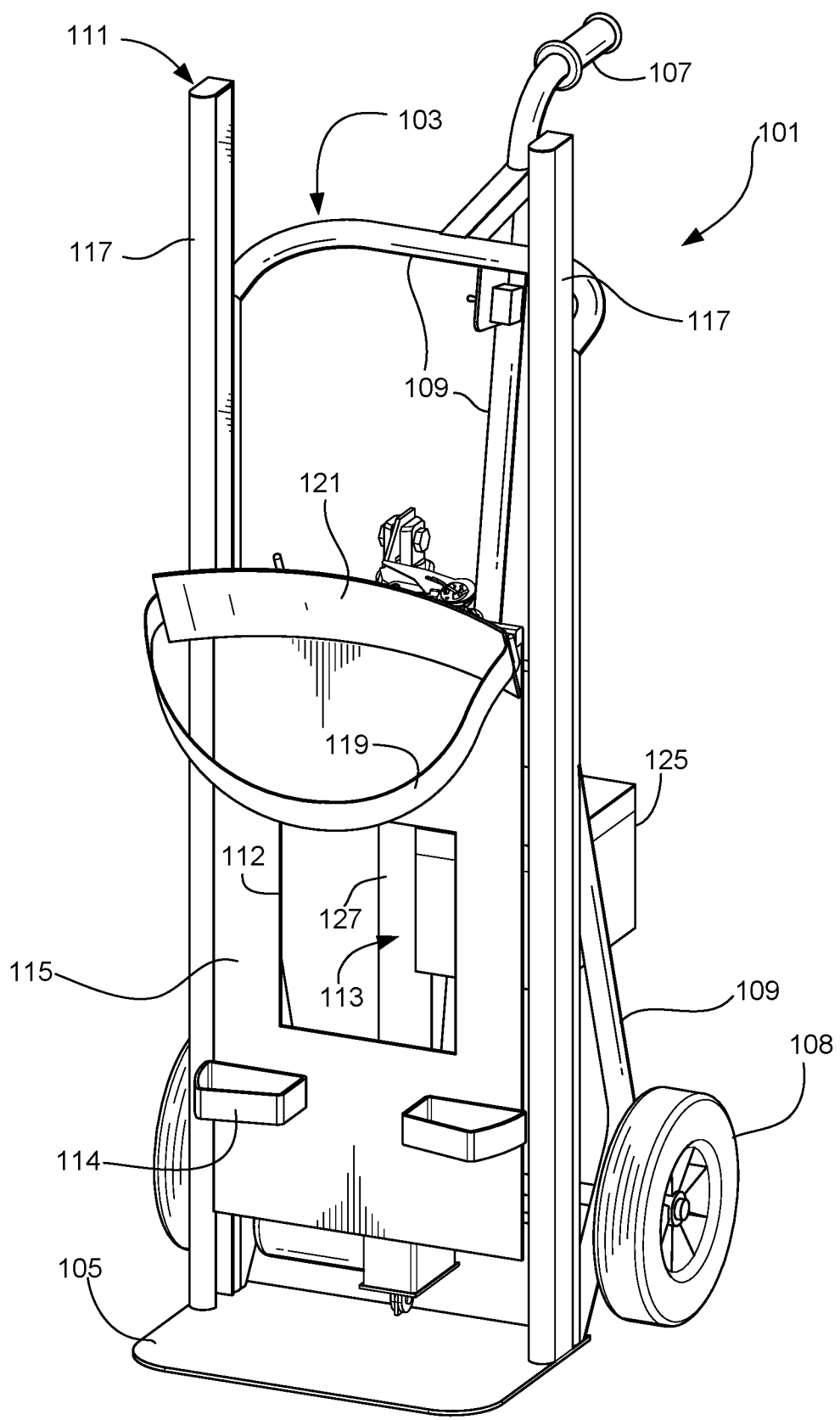
FIG. 1 is a front perspective view of a lift dolly assembly according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, the lift dolly assembly of the present application is configured to permit the selective lifting and reorientating of an object from a first position to a second elevated position and between a first orientation and a second orientation. The lift dolly assembly is configured to easy the relocating and installation of objects like water heaters for example. The lift dolly assembly includes one or more mechanisms to permit the positional changes of the object, which can stem from mechanical or electro-mechanical devices (i.e. motors). These and other unique features and functions are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIGS. 1-4 in the drawings, a lift dolly assembly 101 is illustrated. Lift dolly assembly 101 includes a lift dolly 103 having a base plate 105, a handle 107, and a frame 109. Dolly 103 includes one or more wheels 108 to permit frame 109 and base plate 105 to carry an object or load by tilting dolly 103 backwards. In operation an operator holds handle 107 to support any load and wheels the object to a particular location. Dolly 103 is similar to the operation of conventional dollies.

Assembly 101 also includes a track 111, a lift mechanism 113, and a lift plate 115. These components are configured to work in communication with dolly 103 to support and allow the elevating and orienting of an object or load. In general operation, an object is located on base plate 105 and is secured to lift plate 115. Lift mechanism 113 is configured to locate the object between a first position and a second elevated position. Lift plate 115 is coupled to track 111 and translates up and down via track 111. Track 111 includes opposing channels 117 located on each side of frame 109.

Lift mechanism 113 is configured to selectively permit movement of lift plate 115 along track 111. Lift plate 115 has a back member spread at least partially the width of frame 109 between tracks 111. One or more apertures 112 or protrusions 114 are permitted to assist is lift plate 115 in conforming to the size and dimensions of an object to be lifted. As noted previously, the object may be that of a water heater. As depicted in FIG. 1 within a front perspective view, lift plate 115 is partially concave with a central aperture 112. Protrusions 114 are located at a lower portion of plate 115 and are used to support a lower portion of the water heater or other object it may carry. It is understood that the exact form of plate 115 is not limited to that depicted in FIGS. 1-4 but is adaptable to be of many different forms to suit the particular needs of an operator. The depicted shape is only one such embodiment for plate 115.

Figure 2:
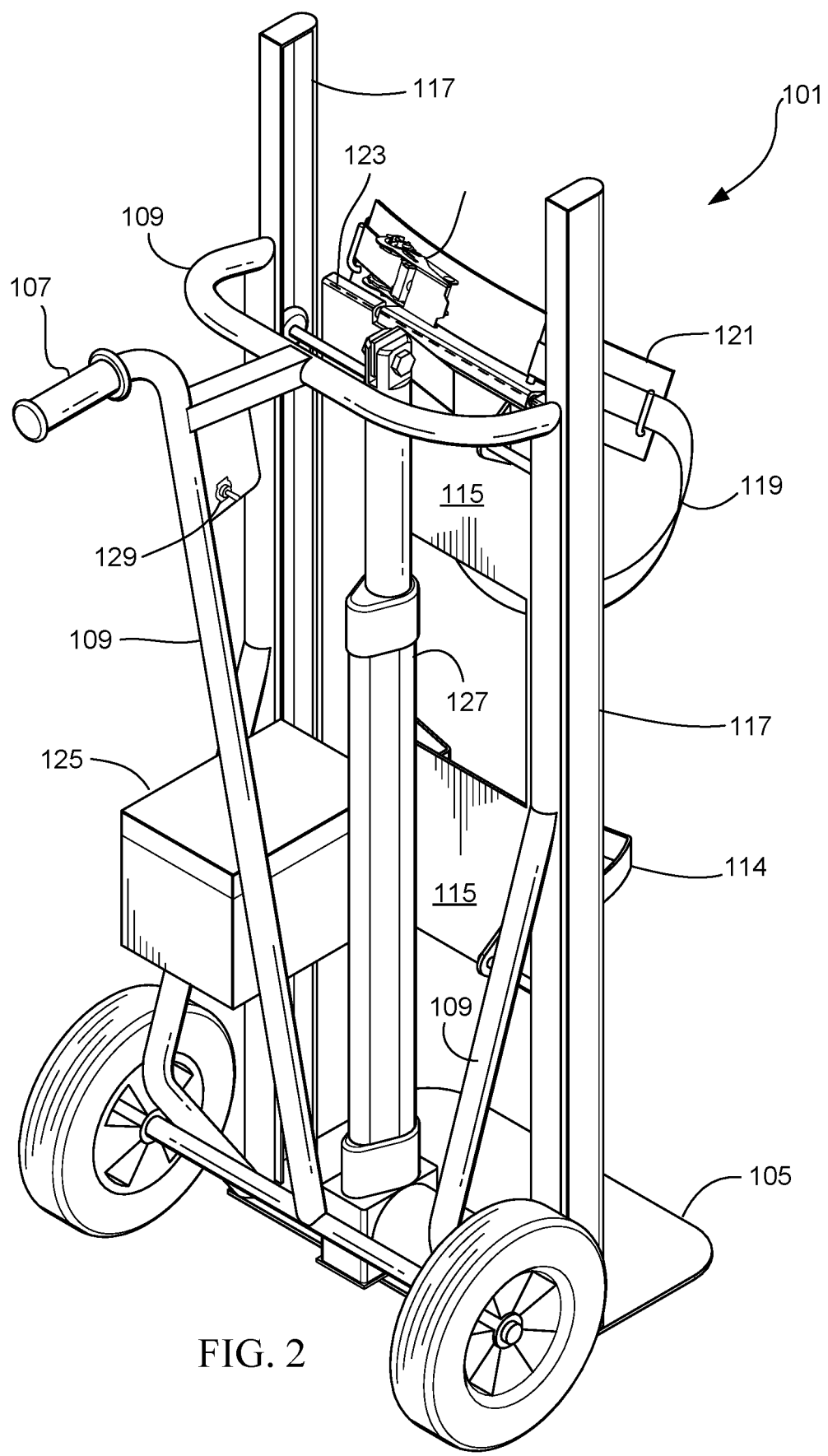
FIG. 2 is a rear perspective view of the lift dolly assembly of FIG. 1.

Referring in particular with FIG. 2, a rear perspective view of assembly 101 is illustrated with lift plate 115 partially elevated. Lift plate 115 includes a securement device 119 and a pivoting plate 121. Pivoting plate 121 is coupled to an upper section of plate 115 and is configured to also contact the object to be lifted (see FIG. 4). Pivoting plate 121 is hingedly coupled such that it can rotate about an axis 123 (see FIG. 2). Securement device 119 is coupled to plate 121 and is configured to attach to or around the object so as to compress it against plate 121. Securement device 119 can be one of many types of devices. Device 119 is depicted as a strap with a corresponding ratchet to allow selective tightening of the trap around the object. Device 119 may be done in different manners and is configured to attach to pivoting plate 121 at at least two points. Thereby it can provide resistance to rolling of the object and separation of the object from plate 121. As pivoting plate 121 rotates about axis 123, securement device 119 also rotates.

Lift mechanism 113 is coupled to frame 109 and is also coupled to lift plate 115. Lift mechanism 113 is configured to selectively induce movement of lift plate 115 along track 111. Lift mechanism 113 may be one or more components and can include mechanical means or electrical means to accomplish the selective movement of lift plate 115. For example, lift mechanism 113 may include one or more gears and levers to allow manual operation of lift plate 115.

Alternatively, lift mechanism 113 be an electro-mechanical device, including components such as motor 125 and a piston 127. In this configuration, motor 125 is operated through a control device 129. Device 129 can select the direction of travel of plate 115 and also turn on/off the motor 125. As motor 125 is activated, piston 127 either extends or retracts thereby raising or lowering lift plate 115.

Figure 3:
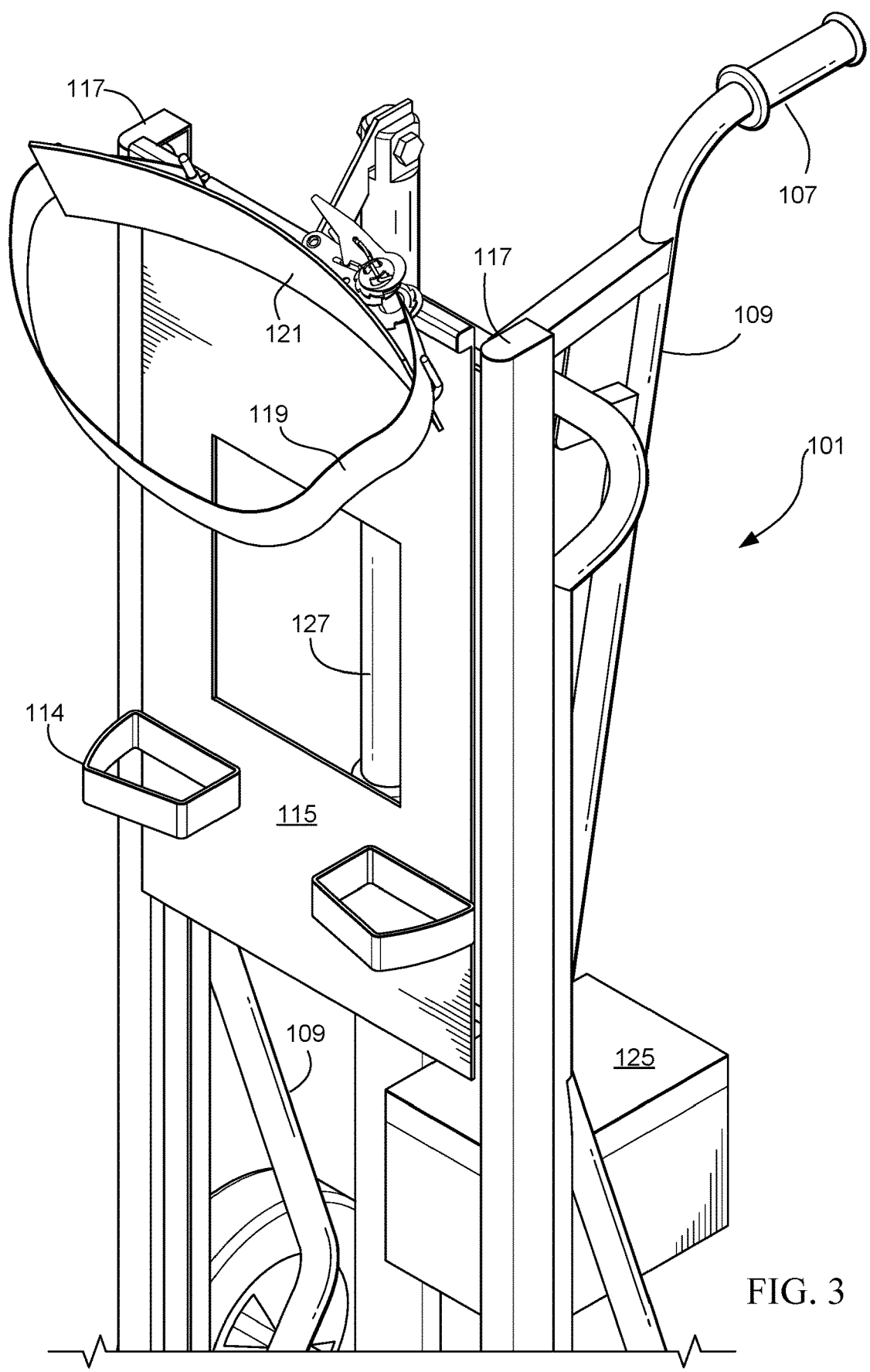
FIG. 3 is a partially enlarge front perspective view of the lift dolly of FIG. 1 with a lift plate in an elevated position.
Figure 4:
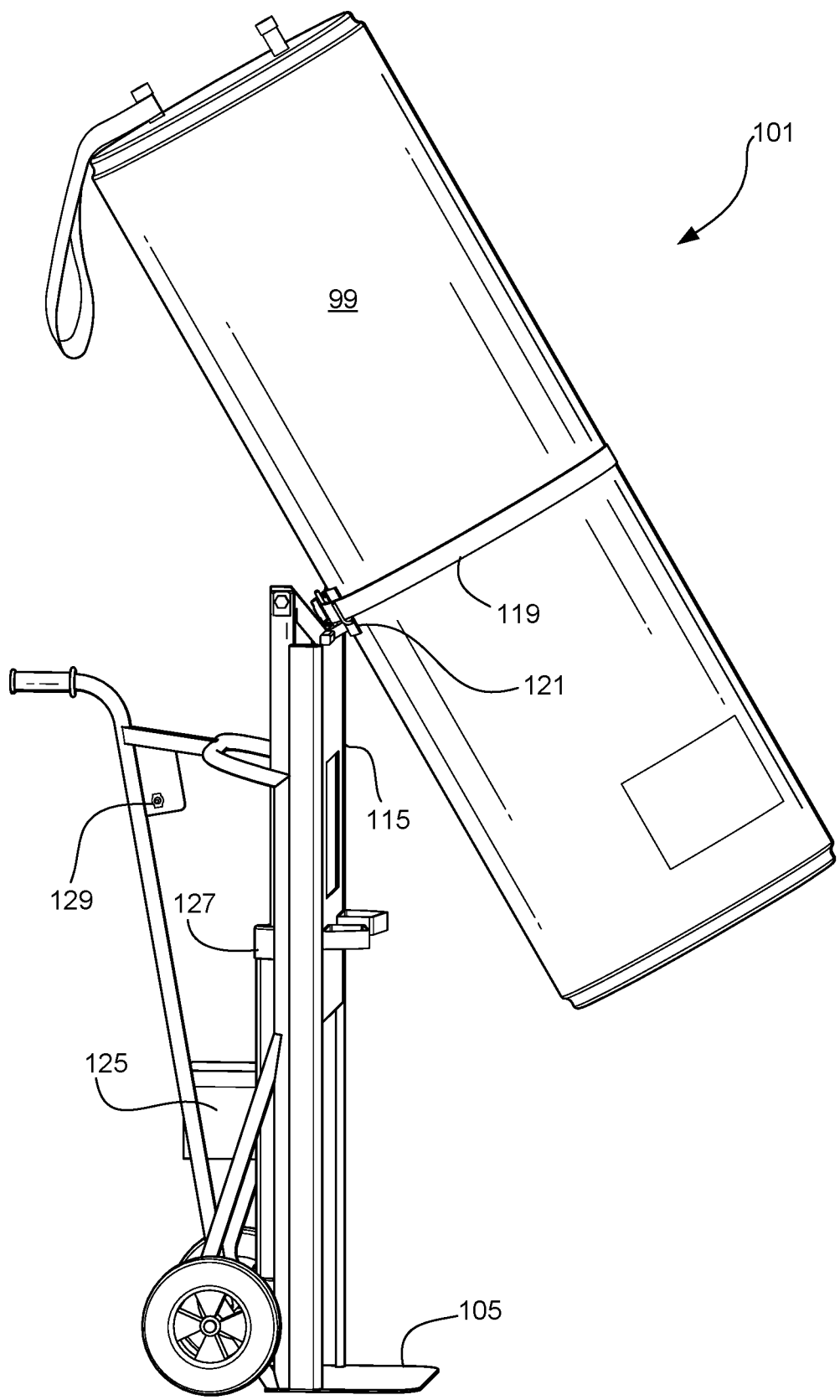
FIG. 4 is a side view of the lift dolly of FIG. 1 relocating a water tank.

FIG. 3 provides an enlarged front perspective view of assembly 101 wherein lift plate 115 is fully elevated. In FIG. 4 a side view of assembly 101 is shown with object 99 (i.e. water heater) illustrated at a tilted orientation.

Assembly 101 is ideally suited and designed to permit the lifting and selective orientating of an object relative to frame 109. FIG. 4 is useful to depict such function. In operation a user may need to lift a heavy object. That object is located adjacent base plate 105 and is selectively secured via device 119 to that of plate 115 and plate 121. Protrusions 114 may also contact the object 99 at a lower point than plate 121. The user may then elevate the object by using control device 129 and lift mechanism 113. The object 99 translates between a first position (on base plate 105) and a second elevated position as plate 115 rides along channels 117. Objects may be raised and lowered between these positions.

An additional function of assembly 101 is the ability to also pivot the object relative to dolly 103 when elevated. Pivoting plate 121 and device 119 are secured to the object 99. Object 99 may then be oriented from a vertical orientation to that of a non-vertical orientation (as shown in FIG. 4). A benefit of this function is that a user may then locate the base of object 99 out in front of base plate 105. The user may raise and/or lower lift plate 115 while object 99 is orientated vertically or non-vertically. With the base of the object fully in front of base 105, the user may then lower object 99 over an edge on the ground (i.e. basin for the water heater). The user may elect to tip dolly 102 at any point to assist in making contact between object 99 and the ground on the other side of an elevated edge. Securement device 119 may be removed. Prior to removal, it is possible that object 99 is situated vertically in the basin and dolly 103 is in a non-vertical orientation. Device 119 may be removed in such orientation. The user may then relocated the position of lift plate 115. The same functions may be permitted in reverse to assist in removing object 99 from a particular location as well.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A lift dolly assembly, comprising:
a dolly having a base plate and a handle each coupled to a frame, the base plate affixed to the frame of the dolly;
a track having opposing channels, the track coupled to a surface of the frame;
a lift mechanism coupled to the frame and configured to selectively permit movement along the track; and
a lift plate coupled to the lift mechanism and inserted in communication with the track, the lift plate configured to translate within the track so as to move between a first position and a second position, the lift mechanism selectively regulating operation of the lift plate;
a curved pivoting plate coupled to the lift plate, the curved pivoting plate configured to curve away from the frame;
a securement device coupled to the pivoting plate and configured to include a strap designed to wrap around an object on the frame and compress such an object;
wherein the lift mechanism selectively lifts the object off the base plate while the frame is in a vertical orientation.

2. The assembly of claim 1, wherein the lift mechanism is a mechanical device.

3. The assembly of claim 1, wherein the lift mechanism is an electro-mechanical device.

4. The assembly of claim 3, wherein the lift mechanism includes an electric motor and a piston, the piston coupled to the lift plate.

5. The assembly of claim 1, wherein the securement device is configured to pivot about the axis along with the pivoting plate.

6. The assembly of claim 1, wherein the pivoting plate is able to pivot while the lift plate operates between the first position and the second position.

7. A method of maneuvering an object with a lift dolly assembly, comprising:
obtaining a lift dolly assembly as in claim 1;
locating the object on the base plate;
securing the object to the lift plate by compressing the object with the securement device configured to wrap around the object;
elevating the object relative to the frame above the base plate; and
pivoting the object when elevated such that the object pivots away from the base plate while the frame is in a vertical orientation, the frame supported by the base plate.

8. The method of claim 7, wherein the object contacts a pivoting plate coupled to the lift plate.

9. The method of claim 8, wherein the pivoting plate pivots about an axis to permit the orientation of the object to change between a first orientation and a second orientation.

10. The method of claim 7, further comprising:
tipping the lift dolly to locate a portion of the object over an edge.

11. The method of claim 10, further comprising:
lowering the object.

12. The method of claim 7, further comprising:
adjusting an orientation of the object while at least one of raising and lowering the lift plate.

* * * * *